United States Patent
Park et al.

(10) Patent No.: US 7,035,894 B2
(45) Date of Patent: Apr. 25, 2006

(54) METHOD FOR RETRANSMITTING DATA EFFICIENTLY IN MOBILE COMMUNICATION SYSTEM

(75) Inventors: Jae-Hong Park, Seoul (KR); Chong-Won Lee, Seoul (KR); Yu-Ro Lee, Seoul (KR); Jeong-Hwa Ye, Seoul (KR)

(73) Assignee: UTStarcom Inc., Alameda, CA (US)

( * ) Notice: Subject to any disclaimer, the term of this patent is extended or adjusted under 35 U.S.C. 154(b) by 674 days.

(21) Appl. No.: 09/832,252

(22) Filed: Apr. 10, 2001

(65) Prior Publication Data

US 2002/0002064 A1    Jan. 3, 2002

(30) Foreign Application Priority Data

Apr. 10, 2000  (KR) ............................. 2000-18586

(51) Int. Cl.
G06F 15/16 (2006.01)
G01R 31/28 (2006.01)
H04J 3/24 (2006.01)
H04J 3/16 (2006.01)

(52) U.S. Cl. ............... 709/200; 709/213; 714/748; 714/749; 714/750; 714/751; 370/349; 370/469; 370/475

(58) Field of Classification Search ............ 371/6; 709/200, 230, 231, 232, 213; 370/252, 428, 370/349, 469, 475, 912, 913; 714/748–751, 714/778, 746
See application file for complete search history.

(56) References Cited

U.S. PATENT DOCUMENTS

| 5,870,406 | A   |   | 2/1999  | Ramesh et al. ............ 371/6 |
| 5,946,320 | A   | * | 8/1999  | Decker ................... 370/428 |
| 6,021,124 | A   |   | 2/2000  | Haartsen ................. 370/336 |
| 6,052,812 | A   |   | 4/2000  | Chen et al. .............. 714/751 |
| 6,081,568 | A   |   | 6/2000  | Oda ...................... 375/358 |
| 6,173,431 | B1  | * | 1/2001  | Rittle .................... 714/778 |
| 6,646,993 | B1  | * | 11/2003 | Davies et al. ........... 370/252 |
| 6,661,784 | B1  | * | 12/2003 | Nykanen ................ 370/338 |

* cited by examiner

Primary Examiner—Zarni Maung
Assistant Examiner—Hassan Phillips
(74) Attorney, Agent, or Firm—McDonnell Boehnen Hulbert & Berghoff, LLP

(57) ABSTRACT

A method for retransmitting data between two sides including a reception side and a transmission side in a mobile communication system including one or more mobile stations and one or more radio networks includes the steps of: by the reception side, storing data received from the transmission side in a first storage unit; as a result of an error-checking procedure, if the data are erroneous, requesting the transmission side to retransmit the data; by the transmission side, transmitting to the reception side a first information related to retransmission and retransmitting the requested data; by a combination unit included in the reception side, combining the retransmitted data with the data stored in the first storage unit; if the combined data are not erroneous, clearing the data and the retransmitted data from the first storage unit and transmitting the combined data to a first upper layer included in the reception side; and in response to an ACK signal from the reception side representing that normal data are received, clearing by the transmission side the retransmitted data from a second storage unit.

20 Claims, 5 Drawing Sheets

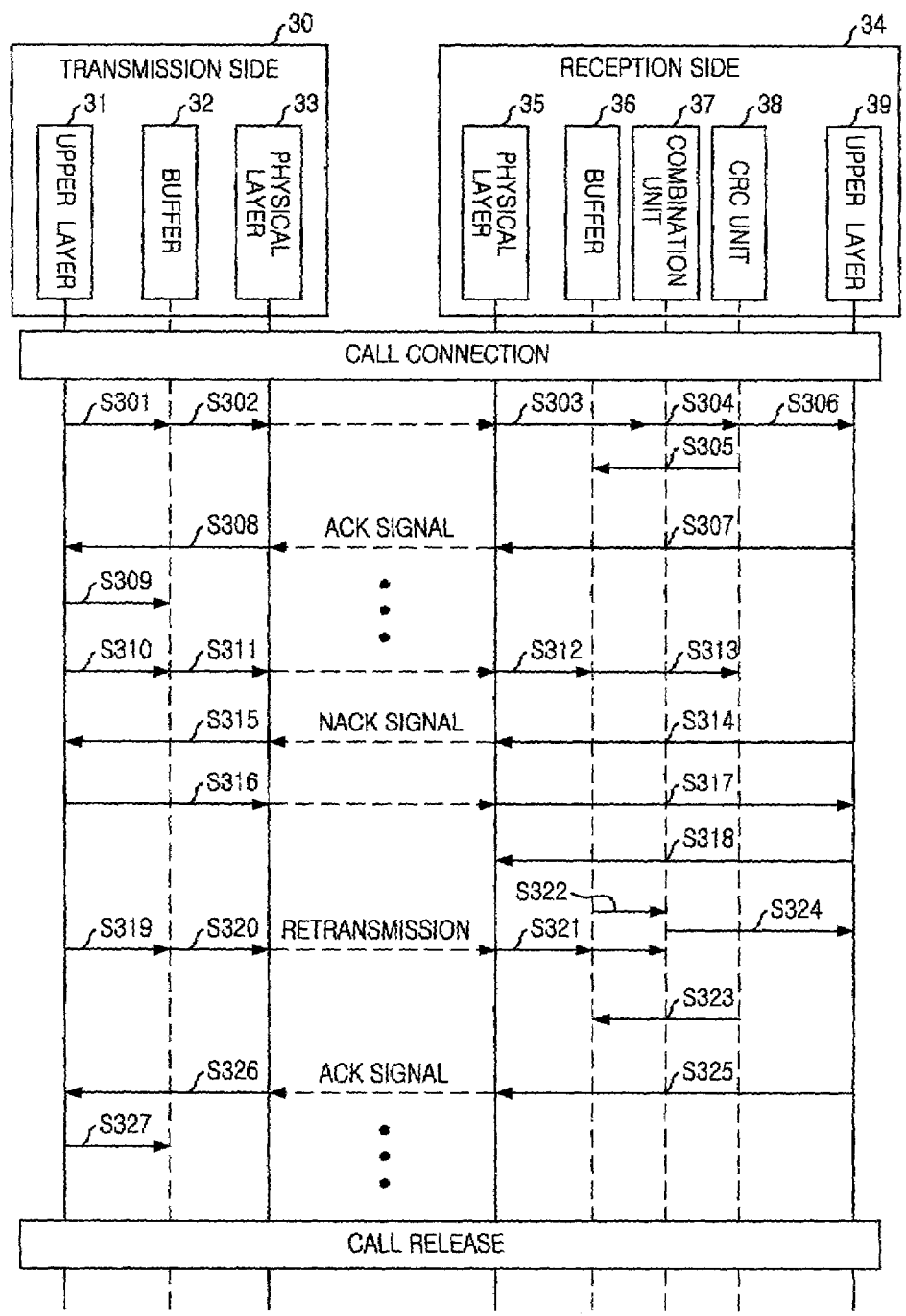

METHOD FOR RETRANSMITTING DATA EFFICIENTLY IN MOBILE COMMUNICATION SYSTEM

FIELD OF THE INVENTION

This invention relates to a method for transmitting data in a mobile communication system; and more particularly, to a method for retransmitting erroneous data efficiently between a mobile station and a radio network in a mobile communication system.

DESCRIPTION OF THE PRIOR ART

Generally, in case erroneous data are received at a reception side, there is provided an automatic repeat request (ARQ) procedure by which the erroneous data can be recovered. The ARQ procedure includes an ARQ type I, an ARQ type II and an ARQ type III.

According to the ARQ type I, in case a reception side receives data that have an error-including data fragment, the reception side requests the transmission side to retransmit the data fragment without storing the error-including data fragment in a storage unit at the reception side. In response to the request, the transmission side retransmits the requested data fragment to the reception side at the same data coding rate as previous one.

According to the ARQ type II, in case the reception side receives data that have the error-including data fragment, the reception side stores the error-including data fragment in the storage unit and then requests the transmission side to retransmit the data fragment. In response to the request, the transmission side generates the requested data fragment at a modified data coding rate and then retransmits the generated data fragment to the reception side.

For example, if a data coding rate for the initial data transmission is "½", the retransmission is performed at a lower data coding rate of "⅓", "¼" or the like. Here, the retransmitted data is not intended to be used itself, but to used after being combined with data received at the reception side in the original retransmission.

The ARQ type III is similar to the ARQ type II. A difference between two types is that the retransmitted data from the transmission side can be used itself or be used after being combined with data received at the reception side before the retransmission.

In case of the ARQ type I, since the error-including data fragment is not stored in the storage unit of the reception side, and the data fragment is retransmitted at the same data coding rate from the transmission side, the problem is that there is a high possibility that the retransmitted data will also have errors again.

In case of the ARQ type II and III, the error correction capability is greater than that of the ARQ type I. However, the retransmitted data cannot be used unless a physical layer of the reception side recognizes in advance that the currently received data are data which the reception side requested a retransmission. Also, in order to use the retransmitted data, the physical layer should not perform combining of the retransmitted data until an upper layer checks if the currently received data is retransmission-requested data, with the stored data thereby causing a time delay.

SUMMARY OF THE INVENTION

It is an object of the present invention to provide a method for retransmitting data between two sides including a reception side and a transmission side in a mobile communication system including one or more mobile stations and one or more radio networks in order to restore erroneous data received by the reception side without a delay-time.

In accordance with an aspect of the present invention, there is provided a method for retransmitting data between two sides including a reception side and a transmission side in a mobile communication system including one or more mobile stations and one or more radio networks, the method including the steps of: by the reception side, storing data received from the transmission side in a first storage unit; as a result of an error-checking procedure, if the data are erroneous, requesting the transmission side to retransmit the data; by the transmission side, transmitting to the reception side a first information related to retransmission and retransmitting the requested data; by a combination unit included in the reception side, combining the retransmitted data with the data stored in the first storage unit; if the combined data are not erroneous, clearing the data and the retransmitted data from the first storage unit and transmitting the combined data to a first upper layer included in the reception side; and in response to an ACK signal from the reception side representing that normal data are received, clearing by the transmission side the retransmitted data from a second storage unit.

BRIEF DESCRIPTION OF THE DRAWINGS

Other objects and aspects of the invention will become apparent from the following description of the embodiments with reference to the accompanying drawings, in which:

FIG. 3 is a flow chart illustrating a method for retransmitting data using an upper layer message in accordance with the present invention.

DETAILED DESCRIPTION OF THE PREFERRED EMBODIMENTS

Figure 1:
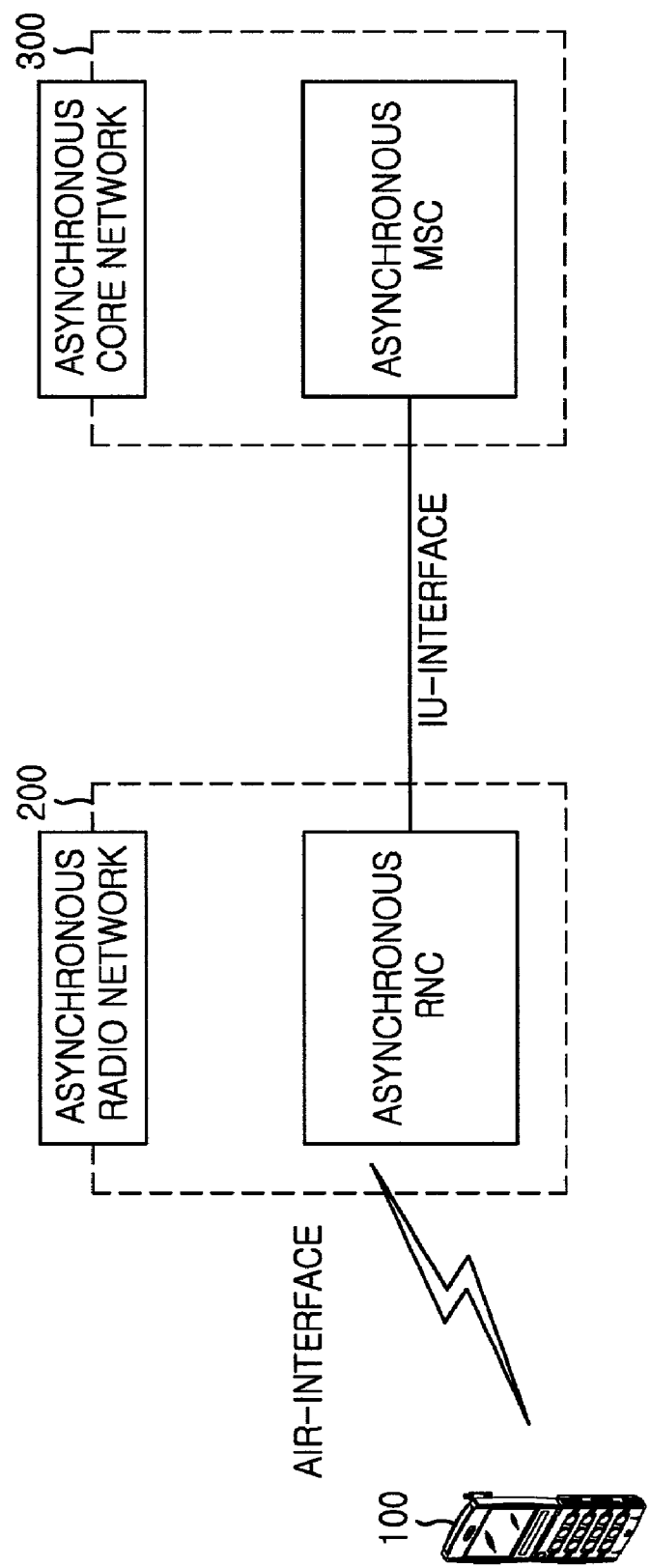
FIG. 1 shows the core network interface architecture of the asynchronous mobile communication system.

FIG. 1 shows the core network interface architecture of the asynchronous mobile communication system.

As shown in FIG. 1, an asynchronous mobile communication system to which the present invention is applied includes an asynchronous mobile station 100, an asynchronous radio network 200 and an asynchronous core network 300.

Particularly, in order to employ hybrid ARQ types II and III technique more efficiently, the present invention is embodied for data retransmission between the asynchronous mobile station 100 and the asynchronous radio network 200.

In more detail, when the asynchronous radio network 200 transmits data to the asynchronous mobile station 100, a transport format combination indicator (TFCI) is included in the data. The TFCI includes information of whether data received at the asynchronous mobile station 100 are retransmitted data or not. Also, An upper layer or a physical layer can analyze the TFCI without getting a support for the analysis from the other layers.

Conversely, the asynchronous mobile station 100 transmits to the asynchronous radio network 200 data including the TFCI by which the asynchronous radio network 200 is informed of retransmitted data or not.

Figure 2A:
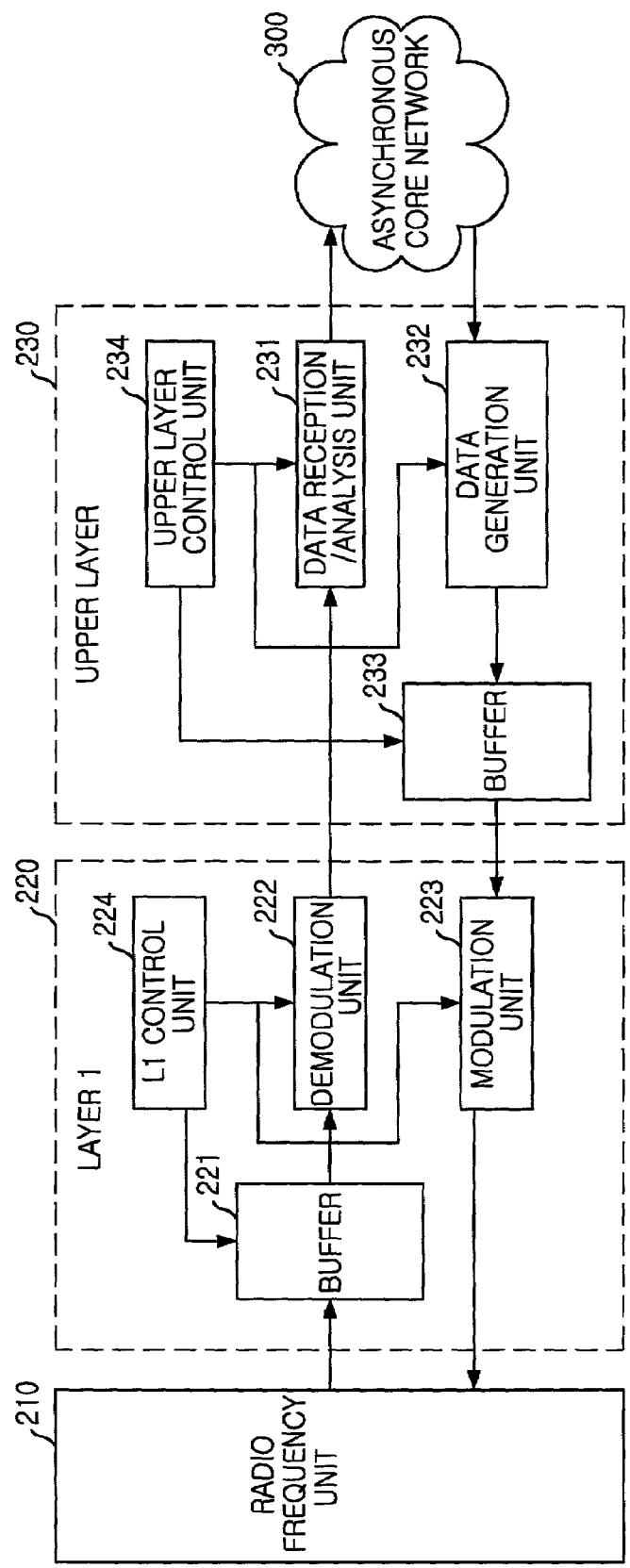
FIG. 2A shows a configuration of an asynchronous radio network to which the present invention is applied.

FIG. 2A shows a configuration of an asynchronous radio network to which the present invention is applied.

As shown in FIG. 2A, when a radio frequency (RF) unit 210 receives radio data from an asynchronous mobile station, the RF unit 210 transmits the radio data to a buffer 221 of a layer 1 220. Also, when receiving modulated data from a modulation unit 223 of the layer 1 220, the RF unit 210 converts a modulated data format to a radio data format and then transmits the converted data to the asynchronous mobile station.

Radio data that are transmitted via the RF unit 210 from the asynchronous mobile station are stored in the buffer 221 of the layer 1 220 and, according to a direction of L 1 control unit 224, the buffer 221 supplies the radio data to a demodulation unit 222 of the layer 1 220.

Under control of the L 1 control unit 224, the demodulation unit 222 demodulates the radio data supplied from the buffer 221 and then transmits the demodulated data to a data reception/analysis unit 231 of an upper layer 230.

The modulation unit 223 modulates data from a buffer 233 of the upper layer 230 according to instructions of the L 1 control unit 224 and then transmits the modulated data to the asynchronous mobile station via the RF unit 210.

As seen from described above, the L 1 control unit 224 controls the buffer 221, the demodulation unit 222 and the modulation unit 223 that are included in the layer 1 220.

The data reception/analysis unit 231 of the upper layer 230 receives and analyzes the demodulated data from the demodulation unit 222 according to a direction of an upper layer control unit 234 and then transmits the data to an asynchronous GSM-MAP core network 300.

A data generation unit 232 of the upper layer 230 supplies data from the asynchronous core network 300 to the buffer 233 of the upper layer 230 under control of the upper layer control unit 234 and the buffer 233 supplies the data stored therein to the modulation unit 223 of the layer 1 220 according to a direction of the upper layer control unit 234.

The upper layer control unit 234 controls the data reception/analysis unit 231, the data generation unit 232 and the buffer 233 that are included in the upper layer 230.

Figure 2B:
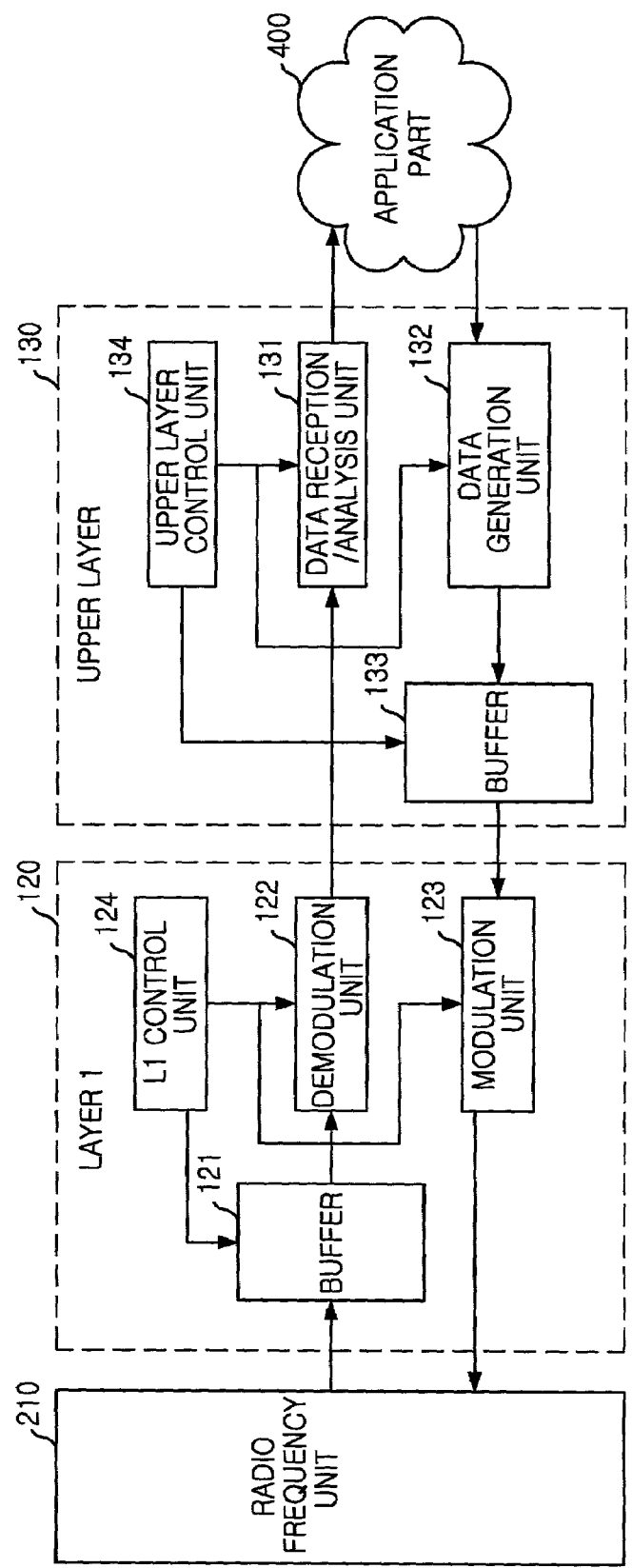
FIG. 2B shows a configuration of an asynchronous mobile station to which the present invention is applied.

FIG. 2B shows a configuration of an asynchronous mobile station to which the present invention is applied.

As shown in FIG. 2B, when a radio frequency (RF) unit 210 receives radio data from an asynchronous radio network, the RF unit 210 transmits the radio data to a buffer 121 of a layer 1 120. Also, when receiving modulated data from a modulation unit 123 of the layer 1 120, the RF unit 210 converts a modulated data format to a radio data format and then transmits the converted data to the asynchronous radio network.

Radio data that are transmitted via the RF unit 210 from the asynchronous radio network are stored in the buffer 121 of the layer 1 120 and, according to a direction of L 1 control unit 124, the buffer 121 supplies the radio data to a demodulation unit 122 of the layer 1 120.

Under control of the L 1 control unit 124, the demodulation unit 122 demodulates the radio data supplied from the buffer 121 and then transmits the demodulated data to a data reception/analysis unit 131 of an upper layer 130.

The modulation unit 123 modulates data from a buffer 133 of the upper layer 130 according to instructions of the L 1 control unit 124 and then transmits the modulated data to the asynchronous radio network via the RF unit 110.

As seen from the above description, the L 1 control unit 124 controls the buffer 121, the demodulation unit 122 and the modulation unit 123 that are included in the layer 1 120.

The data reception/analysis unit 131 of the upper layer 130 receives and analyzes the demodulated data from the demodulation unit 122 according to a direction of an upper layer control unit 134 and then transmits the data to an application part 400.

A data generation unit 132 of the upper layer 130 supplies data from the application part 400 to the buffer 133 of the upper layer 130 under control of the upper layer control unit 134 and the buffer 133 supplies the data stored therein to the modulation unit 123 of the layer 1 120 according to a direction of the upper layer control unit 134.

The upper layer control unit 134 controls the data reception/analysis unit 131, the data generation unit 132 and the buffer 133 that are included in the upper layer 130.

As shown in FIG. 2A and FIG. 2B, in case a data reception side of the asynchronous radio network or the asynchronous mobile station receives data including an erroneous fragment, a buffer in which the data is stored to be combined with retransmitted data is the buffer 121 and 221 included in the layer 1 120 and 220 of respective the asynchronous mobile station 100 and the asynchronous radio network 200. Each buffer 121 and 221 can be placed behind respective demodulation unit 122 and 222.

In case the data reception side requests data retransmission, a data transmission side needs to retransmit data that are previously transmitted to the data reception side. In this case, also there is needed a buffer for storing data that is used for data retransmission. Each buffer 133 and 233 of respective upper layer 130 and 230 is used for this case.

FIG. 3 is a flow chart illustrating a method for retransmitting data using an upper layer message in accordance with the present invention.

Referring to FIG. 3, there is provided how the transmission side transmits to the reception side, via an upper layer, a first message including information of the time when retransmission data will be transmitted before the transmission side transmits the retransmission data to the reception side.

Steps S301 to S309 illustrate a procedure of processing data in case a reception side receives non-erroneous data.

After a call connection, at the step S301, an upper layer 31 of a transmission side 30 transmits data to a buffer 32 of the upper layer 31.

At the step S302, the data are stored in the buffer 32 of the upper layer 31 and then supplied to a physical layer 33 of the transmission side 30. The physical layer 33 transmits the data to the reception side.

After receiving the data from the transmission side, at the step S303, a physical layer of the reception side transmits the data to a buffer 36 of the physical layer 35.

At the step S304, the data are stored in the buffer 36 and then supplied to a cyclic redundancy check (CRC) unit 38. The cyclic redundancy check unit 38 checks if the data stored in the buffer 36 are erroneous.

If non-erroneous data are stored in the buffer 36, at the step S305, the cyclic redundancy check unit 38 transmits to the buffer 36 a signal representing that the data need to be cleared from the buffer 36. The reason is that the non-erroneous data need not be stored in the buffer.

At the step S306, the cyclic redundancy check unit 38 transmits the data to an upper layer 39.

At the step S307, the upper layer 39 transmits to the transmission side 30 an ACK (acknowledgement) signal representing that non-erroneous data was received.

At the step S308, the physical layer 33 of the transmission side 30 receives the ACK signal from the reception side 34, and transmits the ACK signal to the upper layer 31 of the transmission side 30.

At the step S309, the upper layer 31 transmits to the buffer 32 of the upper layer 31 a signal representing that the data transmitted to the reception side need to be cleared from the buffer 32 of the upper layer 31.

In the above steps, a procedure of demodulating the data at the physical layer 35 of the reception side 34 can be performed prior or after the step S303.

Steps S310 to S327 illustrate a procedure of processing data in case the reception side receives erroneous data.

At the step S310, the upper layer 31 of the transmission side 30 transmits data to the buffer 32 of the upper layer 31.

At the step S311, the data are stored in the buffer 32 of the upper layer 31 and then supplied to the physical layer 35 of the transmission side 34. The physical layer 35 transmits the data to the reception side.

After receiving the data from the transmission side, at the step S312, the physical layer 35 of the reception side transmits the data to the buffer 36 of the physical layer 35.

At the step S313, the data are stored in the buffer 36 and then supplied to the cyclic redundancy check unit 38. The cyclic redundancy check unit 38 checks if the data stored in the buffer 36 is erroneous. As a result of the check, if the data is erroneous, the cyclic redundancy check unit 38 doesn't transmit the erroneous data to the upper layer 39 and the erroneous data remains stored in the buffer 36 of the physical layer 35.

In case the upper layer fails to receive the desired data during a predetermined time or the other data that are supposed to be received later than the desired data are received ahead, at the step S314, the upper layer 39 of the reception side 34 transmits to the transmission side 30 a NACK (negative acknowledgement) signal representing that desired data are not received.

At the step S315, the physical layer 33 of the transmission side 30 that receives the NACK signal from the reception side 34, transmits the NACK signal to the upper layer 31 of the transmission side 30.

Before the upper layer 31 transmits retransmission data requested from the reception side, at the step S316, the upper layer 31 generates information data and then transmits the information data to the physical layer 35 of the reception side 34 via the physical layer 33 of the transmission side 30. The information data includes information about a retransmission time when the transmission side 30 will transmit the retransmission data to the reception side 34, information about how the transmission side will perform data processing (for example, a data coding rate, puncturing and so on) or the like.

At the step S317, the physical layer 35 of the reception side 34 transmits the information data from the transmission side 30 to the upper layer 39 of the reception side.

At the step S318, the upper layer 39 analyzes the information data, selects necessary information to be used at the physical layer 35 and then transmits the necessary information to the physical layer 35.

At the step S319, the upper layer 31 of the transmission side 30 selects the retransmission data from the buffer 32 of the transmission side.

At the step S320, the buffer 32 of the upper layer 31 transmits the retransmission data to the physical layer 33 and then the physical layer 33 transmits the retransmission data to the reception side. In this case, a way of processing the retransmission data, for example, a data coding rate and a puncturing, at the physical layer 33 is different from that of processing the data for the initial transmission from the transmission side to the reception side. Also, the way of processing the retransmission data is required to conform to the information data that are transmitted to the reception side. Accordingly, it is required that the information data are transmitted to the physical layer 33 earlier than the retransmission data.

At the step S321, the physical layer 35 of the reception side 34 stores the retransmission data from the transmission side in the buffer 36 and then the buffer 36 transmits the retransmission data to a combiner 37 in order to combine the retransmission data with the erroneous data previously stored in the buffer 36.

At the step S322, the buffer 36 transmits the erroneous data to the combiner 37.

At the step S323, the combiner 37 performs combining the retransmission data with the erroneous data and the cyclic redundancy check unit 38 checks if the combined data are erroneous, and if not, transmits to the buffer 36 a clear signal representing that the combined data need to be cleared from the buffer 36.

At the step S324, the cyclic redundancy check unit 38 transmits the combined data to the upper layer 39.

At the step S325, the upper layer 39 transmits to the transmission side the ACK signal representing that non-erroneous data was received.

At the step S326, the physical layer 33 of the transmission side transmits the ACK signal to the upper layer 31 of the transmission side.

At the step S327, the upper layer 31 transmits to the buffer 32 of the upper layer 31 a clear signal representing that the retransmission data needs to be cleared from the buffer 32.

Figure 4:
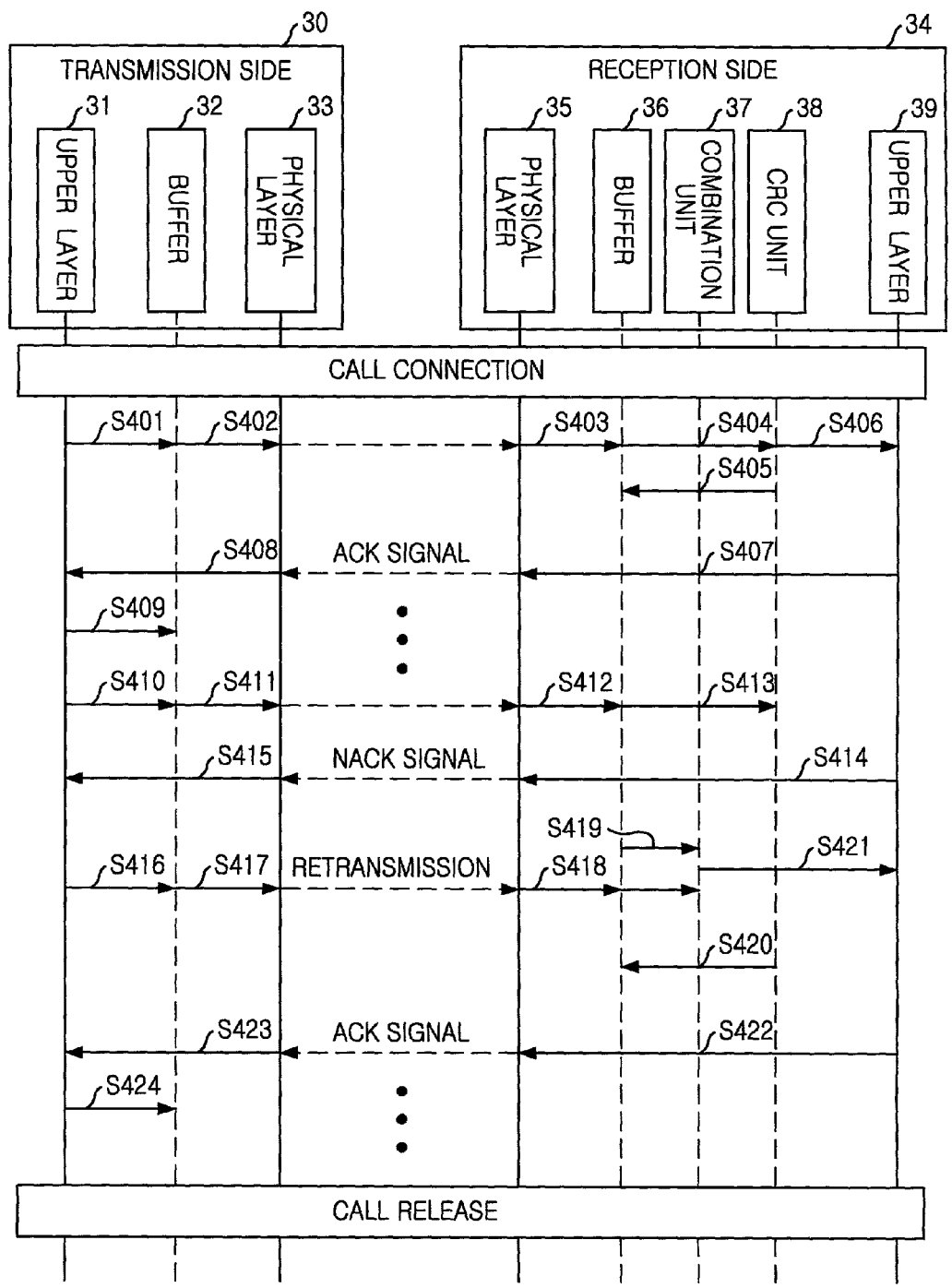
FIG. 4 is a flow chart illustrating a method for retransmitting data using a TFCI (transport format combination indicator) in accordance with the present invention.

FIG. 4 is a flow chart illustrating a method for retransmitting data using a TFCI (transport format combination indicator) in accordance with the present invention.

Referring to FIG. 4, there is provided how the transmission side retransmits erroneous data to the reception side using the TFCI including information indicating that currently transmitted data are retransmission data. A physical layer can interpret the TFCI in a radio frame without the support of the other layer.

Steps S401 to S409 illustrate a procedure of processing data in case a reception side receives non-erroneous data.

After a call connection, at the step S401, an upper layer 31 of a transmission side 30 transmits data to a buffer 32 of the upper layer 31.

At the step S402, the data are stored in the buffer 32 of the upper layer 31 and then supplied to a physical layer 35 of the transmission side 34. The physical layer 35 transmits the data to the reception side.

After receiving the data from the transmission side, at the step S403, a physical layer of the reception side transmits the data to a buffer 36 of the physical layer 35.

At the step S404, the data is stored in the buffer 36 and then supplied to a cyclic redundancy check (CRC) unit 38. The cyclic redundancy check unit 38 checks if the data stored in the buffer 36 is erroneous.

If non-erroneous data is stored in the buffer 36, at the step S405, the cyclic redundancy check unit 38 transmits to the buffer 36 a signal representing that the data can be cleared from the buffer 36. The reason is that the non-erroneous data need not be stored in the buffer.

At the step S406, the cyclic redundancy check unit 38 transmits the data to an upper layer 39.

At the step S407, the upper layer 39 transmits to the transmission side 30 an ACK (acknowledgement) signal representing that the non-erroneous data were received.

At the step S408, the physical layer 33 of the transmission side 30 that receives the ACK signal from the reception side 34, transmits the ACK signal to the upper layer 31 of the transmission side 30.

At the step S409, the upper layer 31 transmits to the buffer 32 of the upper layer 31 a signal representing that the data transmitted to the reception side need to be cleared from the buffer 32 of the upper layer 31.

In the above steps, a procedure of demodulating the data at the physical layer 35 of the reception side 34 can be performed prior or after the step S403.

Steps S410 to S424 illustrate a procedure of processing data in case the reception side receives erroneous data.

At the step S410, the upper layer 31 of the transmission side 30 transmits data to the buffer 32 of the upper layer 31.

At the step S411, the data is stored in the buffer 32 of the upper layer 31 and then supplied to the physical layer 35 of the transmission side 34. The physical layer 35 transmits the data to the reception side.

After receiving the data from the transmission side, at the step S412, the physical layer 35 of the reception side transmits the data to the buffer 36 of the physical layer 35.

At the step S413, the data is stored in the buffer 36 and then supplied to the cyclic redundancy check unit 38. The cyclic redundancy check unit 38 checks if the data stored in the buffer 36 is erroneous. As a result of the check, if the data is erroneous, the cyclic redundancy check unit 38 doesn't transmit the erroneous data to the upper layer 39 and the erroneous data remain stored in the buffer 36 of the physical layer 35.

In case the upper layer fails to receive the desired data during a predetermined time or the other data that are supposed to be received later than the desired data are received ahead, at the step S414, the upper layer 39 of the reception side 34 transmits to the transmission side 30 a NACK (negative acknowledgement) signal representing that desired data was not received.

At the step S415, the physical layer 33 of the transmission side 30 that receives the NACK signal from the reception side 34, transmits the NACK signal to the upper layer 31 of the transmission side 30.

At the step S416, the upper layer 31 of the transmission side 30 selects the retransmission data from the buffer 32 of the transmission side.

At the step S417, the buffer 32 of the upper layer 31 transmits the retransmission data to the physical layer 33 and then the physical layer 33 transmits the retransmission data to the reception side. In this case, a way of processing the retransmission data, for example, a data coding rate and a puncturing, at the physical layer 33 is different from that of processing the data that is transmitted initially from the transmission side to the reception side.

Information about the way of processing the retransmission data is included in the TFCI. The physical layer 35 of the reception side can interpret the TFCI without getting a support from the other layers. The retransmission data together with the TFCI are transmitted to the reception side.

At the step S418, the physical layer 35 of the reception side 34 stores the retransmission data from the transmission side in the buffer 36. The buffer 36 determines if the stored data are the retransmission data by interpreting the TFCI of the received data, and if the received data are the retransmission data, the buffer 36 transmits the retransmission data to a combiner 37 in order to combine the retransmission data with the erroneous data previously stored in the buffer 36.

At the step S419, the buffer 36 transmits the erroneous data to the combiner 37. Interpreting the TFCI at the above step S418 can be performed after or before storing the retransmission data in the buffer 36 of the physical layer 35.

At the step S420, the combiner 37 performs combining the retransmission data with the erroneous data and the cyclic redundancy check unit 38 checks if the combined data are erroneous, and if not, transmits to the buffer 36 a clear signal representing that the combined data need to be cleared from the buffer 36, otherwise the logic flow returns to the step S414.

At the step S421, the cyclic redundancy check unit 38 transmits the combined data to the upper layer 39.

At the step S422, the upper layer 39 transmits to the transmission side the ACK signal representing that non-erroneous data were received.

At the step S423, the physical layer 33 of the transmission side transmits the ACK signal to the upper layer 31 of the transmission side.

At the step S424, the upper layer 31 transmits to the buffer 32 of the upper layer 31 a clear signal representing that the retransmission data may be cleared from the buffer 32.

A procedure of demodulating the retransmission data from the transmission side at the physical layer 35 of the reception side 34 can be performed after or prior the step S418.

In the hybrid ARQ types II/III in accordance with the present invention, there is provided an advantageous effect that erroneous data can be restored without a time delay since the reception side recognizes when the retransmission data will be transmitted thereto. Also, the hybrid ARQ types II/III can be applied to a mobile communication system without modifying system hardware.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for retransmitting data between two sides including a reception side and a transmission side in a mobile communication system including one or more mobile stations and one or more radio networks, the method comprising the steps of:

a) at the reception side, storing data received from the transmission side in a first storage unit;

b) as a result of an error-checking procedure, if the data is erroneous, requesting the transmission side to retransmit the data;

c) at the transmission side, transmitting to the reception side first information related to retransmission and then retransmitting the requested data, wherein the first information includes information about when the transmission side will retransmit the requested data to the reception side;

d) at a combining unit at the reception side, combining the retransmitted data with the data stored in the first storage unit;

e) if the combined data is not erroneous, clearing the data and the retransmitted data from the first storage unit and transmitting the combined data to a first upper layer included in the reception side; and f) in response to an ACK signal from the reception side representing that normal data has been received, clearing at the transmission side the retransmitted data from a second storage unit.

2. The method as recited in claim 1, wherein the first storage unit is included in a first physical layer included in the reception side.

3. The method as recited in claim 1, wherein the second storage unit is included in a second upper layer included in the transmission side.

4. The method as recited in claim 1, wherein the step b) includes the steps of:
   b1) performing the error-checking procedure by a cyclic redundancy check unit;
   b2) if the data is erroneous, failing to transmit the data stored in the first storage unit to the first upper layer included in the reception side; and
   b3) by the first upper layer, requesting the transmission side to retransmit the data by transmitting a NACK signal representing that desired data has not been received.

5. The method as recited in claim 4, wherein the NACK signal is generated at the first upper layer when the desired data has not been received during a predetermined time.

6. The method as recited in claim 4, wherein the NACK signal is generated at the first upper layer when other data, expected to be received after the desired data is received at the upper layer before the desired data.

7. The method as recited in claim 1, wherein the first information includes information about a way of processing the requested data at the transmission side before retransmitting the requested data to the reception side, the way including how to establish a data coding rate and a puncturing.

8. The method as recited in claim 1, wherein the transmission side transmits the first information to the reception side before retransmitting the requested data.

9. The method as recited in claim 1, wherein the first information is transmitted as a first upper layer message.

10. The method as recited in claim 7, wherein the way of processing the requested data at the transmission side before retransmitting the requested data to the reception side is different from the way of processing the data at the transmission side before transmitting the data to the reception side.

11. The method as recited in claim 1, wherein the step b) further includes the steps of:
   g) if the data is not erroneous, clearing the data from the first storage unit and transmitting the data to the first upper layer; and
   h) generating the ACK signal in the first upper layer in response to reception of the data by the first upper layer.

12. The method as recited in claim 1, wherein the step e) further includes the step of:
   if the combined data is erroneous, returning to the step b).

13. A method for retransmitting data between two sides including a reception side and a transmission side in a mobile communication system including one or more mobile stations and one or more radio networks, the method comprising the steps of:
   a) at the reception side, storing data received from the transmission side in a first storage unit;
   b) as a result of an error-checking procedure, if the data is erroneous, requesting the transmission side to retransmit the data;
   c) at the transmission side, transmitting to the reception side information about when the transmission side will retransmit the requested data to the reception side, and then retransmitting to the reception side the requested data and a transport format combination indicator (TFCI);
   d) by a combination unit included in the reception side, combining the retransmitted data with the data stored in the first storage unit;
   e) if the combined data are not erroneous, clearing the data and the retransmitted data from the first storage unit and transmitting the combined data to a first upper layer included in the reception side; and
   f) in response to an ACK signal from the reception side representing that normal data has been received, clearing the retransmitted data from a second storage unit at the transmission side.

14. The method as recited in claim 13, wherein it is determined if the reception side is receiving the retransmitted data by interpreting the transport format combination indicator (TFCI).

15. The method as recited in claim 14, wherein if it is determined that the reception side is receiving the retransmitted data by interpreting the transport format combination indicator (TFCI), the step d) is performed.

16. Computer-readable record media storing instructions for performing a method for retransmitting data between two sides including a reception side and a transmission side in a mobile communication system including one or more mobile stations and one or more radio networks, the method comprising the steps of:
   a) at the reception side, storing data received from the transmission side in a first storage unit;
   b) as a result of an error-checking procedure, if the data is erroneous, requesting the transmission side to retransmit the data;
   c) at the transmission side, transmitting to the reception side a first information related to retransmission and then retransmitting the requested data, wherein the first information includes information about when the transmission side will retransmit the requested data to the reception side;
   d) at a combining unit at the reception side, combining the retransmitted data with the data stored in the first storage unit;
   e) if the combined data is not erroneous, clearing the data and the retransmitted data from the first storage unit and transmitting the combined data to a first upper layer included in the reception side; and
   f) in response to an ACK signal from the reception side representing that normal data has been received, clearing at the transmission side the retransmitted data from a second storage unit.

17. Computer-readable record media storing instructions for performing a method for retransmitting data between two sides including a reception side and a transmission side in a mobile communication system including one or more mobile stations and one or more radio networks, the method comprising the steps of:
   a) at the reception side, storing data received from the transmission side in a first storage unit;
   b) as a result of an error-checking procedure, if the data is erroneous, requesting the transmission side to retransmit the data;
   c) at the transmission side, transmitting to the reception side information about when the transmission side will retransmit the requested data to the reception side, and then retransmitting to the reception side the requested data and a transport format combination indicator (TFCI);

d) by a combination unit included in the reception side, combining the retransmitted data with the data stored in the first storage unit;

e) if the combined data are not erroneous, clearing the data and the retransmitted data from the first storage unit and transmitting the combined data to a first upper layer included in the reception side; and f) in response to an ACK signal from the reception side representing that normal data has been received, clearing the retransmitted data from a second storage unit at the transmission side.

18. The method of claim 1, wherein transmitting the combined data to a first upper layer included in the reception side comprises transmitting the combined data to a data reception unit of the first upper layer for transmission, in turn, of the combined data to an asynchronous core network.

19. The method of claim 1, wherein transmitting the combined data to a first upper layer included in the reception side comprises transmitting the combined data to a data reception unit of the first upper layer for transmission, in turn, of the combined data to an application part that communicates with the first upper layer.

20. The method of claim 14, wherein interpreting the TFCI occurs at a physical layer without support from any other layers to interpret the TFCI.

* * * * *